(12) United States Patent
Estipona

(10) Patent No.: US 7,827,576 B2
(45) Date of Patent: Nov. 2, 2010

(54) ANNOUNCING THE AVAILABILITY OF AN ELECTRONIC PROGRAMMING GUIDE TO RECEIVERS OF ENHANCED TELEVISION TRANSMISSIONS

(75) Inventor: Jim B. Estipona, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 523 days.

(21) Appl. No.: 11/897,311

(22) Filed: Aug. 30, 2007

(65) Prior Publication Data

US 2007/0300254 A1    Dec. 27, 2007

Related U.S. Application Data

(63) Continuation of application No. 09/652,695, filed on Aug. 31, 2000, now Pat. No. 7,284,257.

(51) Int. Cl.
*H04N 5/445* (2006.01)
(52) U.S. Cl. .............................. 725/50; 725/32; 725/39; 725/43; 725/44; 725/45; 725/48; 725/49; 725/51; 725/54

(58) Field of Classification Search ............. 725/32, 725/39, 43–45, 48–49, 50–51, 54
See application file for complete search history.

(56) References Cited

U.S. PATENT DOCUMENTS

| 4,751,578 | A | 6/1988 | Reiter et al. | |
| 6,522,342 | B1 * | 2/2003 | Gagnon et al. | 715/716 |
| 6,557,172 | B1 * | 4/2003 | Carr | 725/139 |

OTHER PUBLICATIONS

Handley et al., Session Announcement Protocol, Oct. 2000, Network Working Group, All Pages.*
Handley et al., SDP: Session Description Protocol, Apr. 1998, Network Working Group, All Pages.*

* cited by examiner

*Primary Examiner*—Jason P Salce
(74) *Attorney, Agent, or Firm*—Trop, Pruner & Hu, P.C.

(57) ABSTRACT

A unique session identifier may be utilized to announce the availability of an electronic programming guide to users of an enhanced television distribution system. In some embodiments, the unique session identifier may be utilized in a variety of systems to provide a uniform way of recognizing the availability of an electronic programming guide in conjunction with enhanced television distribution systems.

40 Claims, 3 Drawing Sheets

ANNOUNCING THE AVAILABILITY OF AN ELECTRONIC PROGRAMMING GUIDE TO RECEIVERS OF ENHANCED TELEVISION TRANSMISSIONS

CROSS-REFERENCE TO RELATED APPLICATION

This application is a continuation of U.S. patent application Ser. No. 09/652,695, filed Aug. 31, 2000 now U.S. Pat. No. 7,284,257.

BACKGROUND

This invention relates generally to interactive or enhanced television content.

Interactive or enhanced television content generally involves the distribution of television programming accompanied by additional content. The additional content, sometimes called an enhancement, may be accessed within the broadcast stream or at a remote location, for example over the Internet. The additional content may be described as a resource that may be accessed through a trigger broadcast with the enhanced television content. In an enhanced television distribution system, announcements are used to announce currently available programming to the receiver. Having received the announcement, a receiver may listen to a specified port and address to obtain the announced information.

An electronic programming guide (EPG) is content that is used to determine the programming related information available on a current connection. A current connection may be an analog or digital video distribution source. As examples, a connection may include a cable connection, a broadcast connection or a satellite connection. An electronic programming guide may be in the form of a graphical user interface or presentation files that indicate a channel-to-programming map or channel map. The guide enables the user to determine what programs are available on what channels.

In enhanced television distribution schemes, an electronic programming guide may be distributed through the television content distribution system. An electronic programming guide may actually be distributed to a plurality of receivers or at least the electronic programming guide may be sufficiently identified through the broadcast data to enable it to be accessed by the receiver.

Conventionally, the distribution of an electronic programming guide is indicated in different ways in different television distribution systems. For example, Broadcast Plus may utilize announcements with a required field a=cid:XXXX. Other entities send such announcements without the required Broadcast Plus format. Thus, Broadcast Plus can not receive the enhancements based for example on the client tool kit distributed by Intel Corporation. Similarly, WebTV® based content (from Microsoft Corporation) announces the availability of various resources in different ways. Thus, there is no uniform way to announce the availability of an electronic programming guide that is recognized by all the available system/software providers.

Therefore, there is a need for a way to enable receivers to determine that an electronic programming guide is available regardless of the hardware or software utilized.

DETAILED DESCRIPTION

Figure 1:
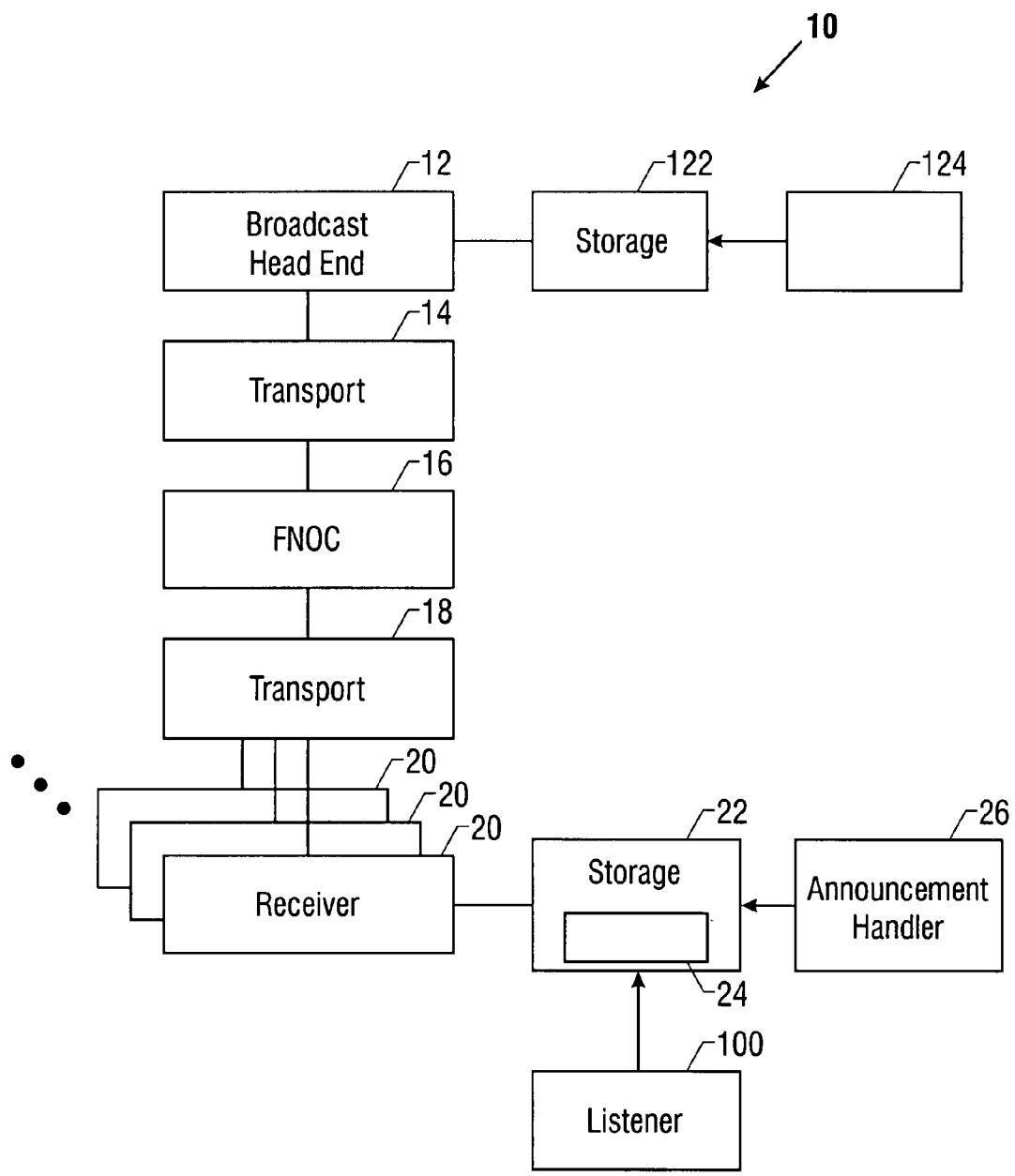
FIG. 1 is a schematic depiction of one embodiment of the present invention.

Referring to FIG. 1, an enhanced television content distribution system 10 may include a broadcast head end 12 that distributes the enhanced television content. The head end 12 distributes the content over a transport 14. The transport 14 may include a cable, airwave, or satellite distribution system, as examples.

In some embodiments, the broadcast head end 12 may distribute the content directly to receivers which do not thereafter rebroadcast the content but rather, make the content available for viewing on the receiver itself. In other cases, the content may be rebroadcast by a rebroadcaster or network operating center (NOC). Thus, as illustrated in FIG. 1, an NOC 16 may be coupled to the head end 12 by a transport 14. Similarly, the NOC 16 may be coupled to a plurality of receivers 20 by a transport 18. The transports 14 and 18 may utilize different technologies.

Each receiver 20 may include a storage device 22 that stores software including an announcement handler 26 and an EPG listener 100. The announcement handler 26 listens for announcements in the distributed content and provides an indication for that announcement to the receiver 20. For example, information about available enhancements may be displayed on a monitor or television associated with the receiver 20. In addition, the storage 22 may include a cache 24. The cache 24 may be utilized to cache enhancements, such as an EPG, that are identified by the announcement handler 26, in some embodiments of the present invention.

Figure 2:
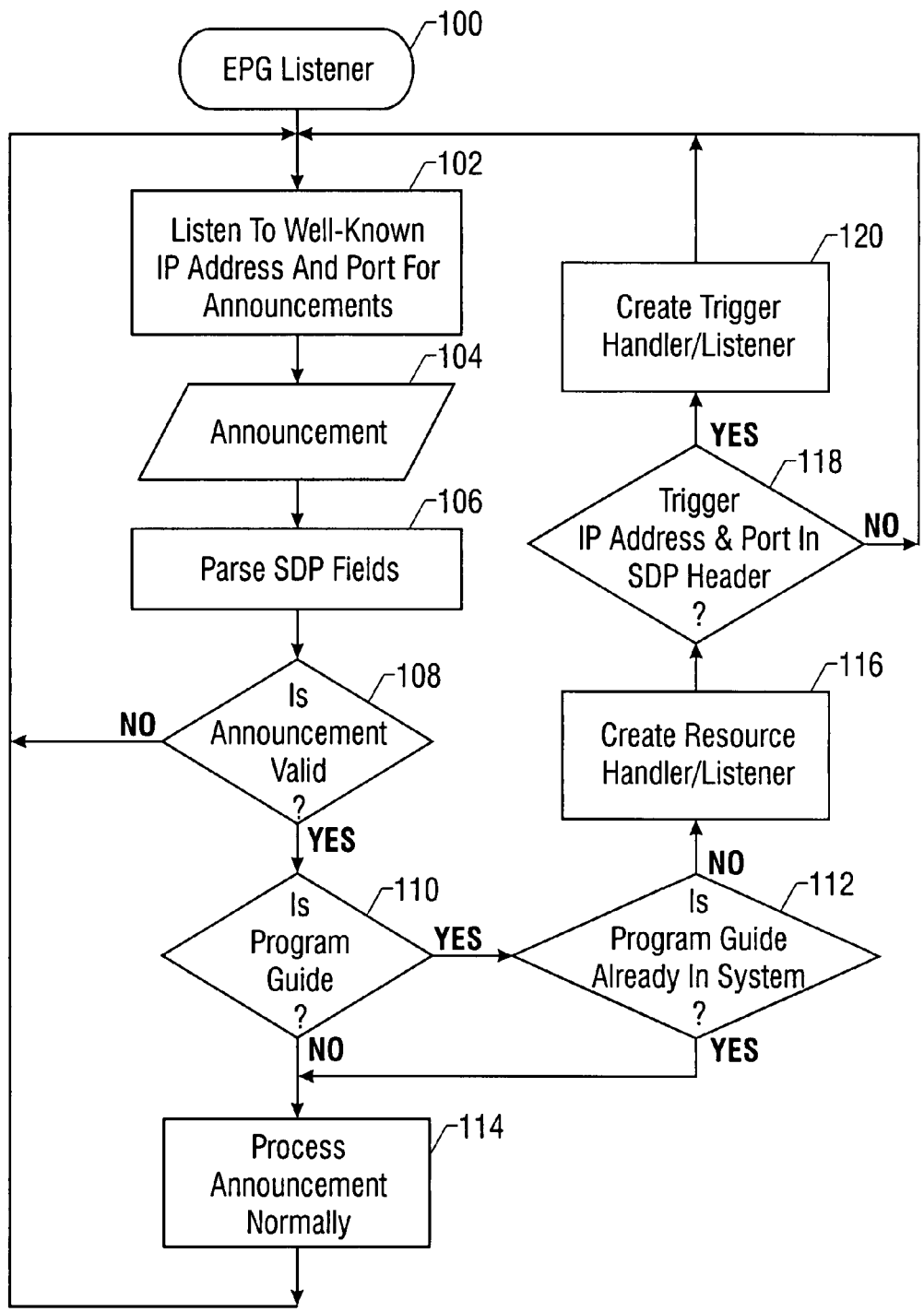
FIG. 2 is a flow chart for software in accordance with one embodiment of the present invention.

The announcement handler software 26, shown in FIG. 1, begins by listening to well known Internet Protocol (IP) address and port for announcements as indicated at block 102 of FIG. 2. That is, the receiver 20 is aware of established ports and addresses for announcements. The distribution of enhanced television content is well established and may be implemented in accordance with known protocols.

One such protocol is the Advanced Television Enhancement Form (ATVEF) Specification, Draft Version 1.1 r.26, updated Feb. 2, 1999. That specification includes standards for announcements and provides a specific announcement protocol. For example, announcements may be implemented in accordance with the session description protocol (SDP) promulgated by the Network Working Group and published as Request for Comments (RFC) 2327 dated April 1998. The IP multicast addresses and ports for resource transfers are announced using SDP announcements. Announcements may be sent on a well known address (224.0.1.113) and port (2670) pursuant to the ATVEF specification.

The ATVEF announcement protocol sets forth a well established SDP header format. That format includes a session description including a protocol version, an owner/creator and session identifier, a session name, and additional information set forth for example in the ATVEF specification. The owner/creator and session identifier field specifies a user name, session identifier (sid) and version followed by an IP address, as set forth in the ATVEF specification. The session identifier is a Network Time Protocol (NTP) value as identified in the NTP Version 3 Specification, published by D. Mills as RFC 1305 on March 1992. The UNIX time is basically an offset value to the NTP value. The next field in the announcement protocol is the session name which is a required field. It is specified by the variable s equals the appropriate name.

In accordance with one embodiment of the present invention, the session identifier or sid is specified to be equal to the UNIX zero time value (which necessarily otherwise would never be utilized). The UNIX zero time value is equivalent to the NTP value 2208988800. Thus, the announcement protocol may specify a sid equal to 2208988800. The session name may be specified as "program guide" or s equals program guide. In this way, a well established session identifier and session name may be utilized by all broadcasting entities. This protocol enables an electronic programming guide to be readily identified in any format or system. In addition, by providing the session name "program guide" in the announcement protocol, a user viewable list or display box may be displayed to advise the user of the availability of a program guide.

Thus, an example of a hypothetical announcement protocol, compliant with the ATVEF specification, in accordance with one embodiment of the present invention, is as follows:

```
v=0
o=-2208988800 2890844526 IN IP4 tve.niceBroadcaster.com
s=program guide
e=help@niceBroadcaster.com
a=UUID:f8ld4fae-7dec-11do-a765-00a0c91e6bf6
a=type:tve
a=tve-level:1.0
t=2873397496 O
a=tve-ends:30000
a=tve-type:primary
m=data 52127/2 tve-file/tve-trigger
c=IN IP4 224.0.1.112/127
b=CT:100
a=tve-size:1024
m=data 52127/2 tve-file/tve-trigger
c=IN IP4 224.0.0.1/127
b=CT:1024
a=tve-size:4096
```

Thus, the second line, second variable specifies a program guide by the use of a unique number corresponding to the UNIX zero value. The third line specifies a session name "program guide" which may be extracted and displayed in a human readable format.

Returning to FIG. 2, an announcement may be detected as indicated at 104 by the announcement handler 26. When an announcement is detected, the header's SDP fields are parsed as indicated in block 106. If the announcement is valid, as determined at diamond 108, a check at diamond 110 determines whether a program guide is announced. The determination of whether an electronic programming guide is being announced is based on the number in the session identifier (sid) field.

If an electronic programming guide has been announced, a check at diamond 112 determines whether the electronic programming guide is already cached in the cache 24. If so, or if the announcement does not relate to an electronic programming guide, the announcement is processed normally as indicated in block 114. In the case where the electronic programming guide is not already stored in the cache 24, a resource handler/listener may be created as indicated in block 116. A trigger Internet Protocol address and port number contained in the SDP header may be identified at diamond 118. If so, a trigger handler listener may be developed (block 120). Otherwise, the software simply iterates, having received the appropriate announcements.

Embodiments of the present invention do not require a back channel or uplink to acquire the electronic programming guide. Avoiding the need for an uplink to acquire the electronic programming guide may make the receiver more robust to network or modem failures, geographical difficulties/differences and may also lower the initial cost of ownership of the receiver while reducing the uplink channel subscription cost as well. In addition, a fully ATVEF-compliant announcement needs no special session attribute in the SDP header to ensure that the announcement will be recognized by ATVEF-compliant receivers. Moreover, no optional field is needed in the ATVEF SDP header for the EPG announcement. In addition, a special channel for the electronic programming guide is not needed but instead may be accessed as any type of enhancement may be accessed in an enhanced television broadcast.

As shown in FIG. 1, the head end 12 may also include a storage 122. The head end may include a processor-based system which is capable of executing software such as the software 124 stored on the storage 122.

Figure 3:
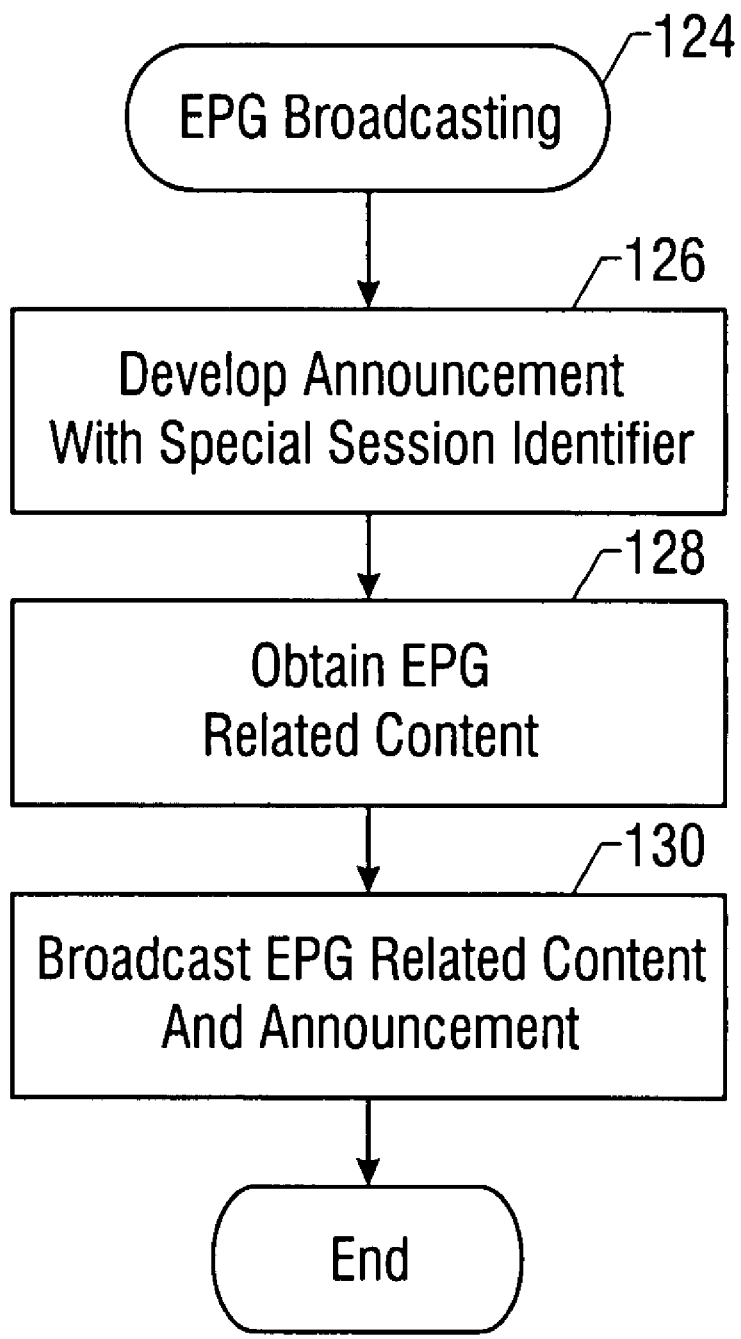
FIG. 3 is a flow chart for software in accordance with another embodiment of the present invention.

Referring to FIG. 3, the software 124 facilitates the distribution of enhanced television content that identifies an electronic programming guide for the enhanced content. Initially, an announcement is developed with the special session identifier and session name described previously and as indicated in block 126. The electronic programming guide related content is then obtained as indicated in block 128. The electronic programming guide related content and the announcement may be broadcast at the same or different times as indicated in block 130.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer-implemented method comprising:
   establishing a communication session with a terminal;
   transmitting information to the terminal, wherein the information includes an electronic programming guide identifier having a value representing the availability of an electronic programming guide for enhanced television content; and
   transmitting the enhanced television content to the terminal, said identifier linking the enhanced television content and the electronic programming guide.

2. The method of claim 1, wherein the transmitting the electronic programming guide identifier comprises transmitting the electronic programming guide identifier using a session description protocol.

3. The method of claim 1, wherein the transmitting the electronic programming guide identifier comprises transmitting the electronic programming guide identifier in a header specified by a session description protocol.

4. The method of claim 1, wherein the transmitting the electronic programming guide identifier comprises transmitting the electronic programming guide identifier in a session identifier.

5. The method of claim 1, wherein the transmitting the electronic programming guide identifier comprises transmitting the electronic programming guide identifier to an internet protocol address.

6. The method of claim 1, wherein the electronic programming guide identifier comprises a descriptor.

7. The method of claim 1, wherein the electronic programming guide identifier comprises a unique number.

8. The method of claim 7, wherein the electronic programming guide identifier comprises the number 2208988800.

9. The method of claim 1, wherein:

a broadcast computer system performing the establishing, transmitting information, and transmitting enhanced television content, and the broadcast computer system transmitting information and enhanced television content to the terminal through a broadcast network.

10. The method of claim 1, wherein:

the terminal comprises a media device, an integration node computer system receiving media content, the integration node computer system integrating the media content with the enhanced television content, and the integration node computer system performing the establishing, transmitting information, and transmitting enhanced television content.

11. A system comprising:

an antenna and a broadcast computer system configured to:
request a connection with a terminal,
provide information, wherein the information includes an electronic programming guide identifier having a value representing the availability of an electronic programming guide for enhanced television content,
provide the enhanced television content, said identifier linking the enhanced television content and the electronic programming guide; and
transmit the request, information, and content using the antenna to the terminal.

12. The system of claim 11, wherein to transmit the electronic programming guide identifier, the broadcast device is to transmit the electronic programming guide identifier using a session description protocol.

13. The system of claim 11, wherein to transmit the electronic programming guide identifier, the broadcast device is to transmit the electronic programming guide identifier in a header specified by a session description protocol.

14. The system of claim 11, wherein to transmit the electronic programming guide identifier, the broadcast device is to transmit the electronic programming guide identifier in a session identifier.

15. The system of claim 11, wherein to transmit the electronic programming guide identifier, the broadcast device is to transmit the electronic programming guide identifier to an interne protocol address.

16. The system of claim 11, wherein the electronic programming guide identifier comprises a descriptor.

17. The system of claim 11, wherein the electronic programming guide identifier comprises a unique number.

18. The system of claim 17, wherein the electronic programming guide identifier comprises the number 2208988800.

19. The system of claim 11, wherein:

the broadcast computer system is to transmit the request, information, and content to the terminal through a broadcast network.

20. The system of claim 11, wherein:

the terminal comprises a media device and the broadcast computer system comprises an integration node computer system to receive media content and integrate media content with the enhanced television content.

21. A computer-implemented method comprising:

maintaining a communication session with a broadcast terminal;

receiving information from the broadcast terminal, wherein the information includes an electronic programming guide identifier having a value representing availability of an electronic programming guide for enhanced television content from the broadcast terminal; and receiving the enhanced television content, said identifier linking the enhanced television content and the electronic programming guide.

22. The method of claim 21, wherein the receiving the electronic programming guide identifier comprises receiving the electronic programming guide identifier using a session description protocol.

23. The method of claim 21, wherein the receiving the electronic programming guide identifier comprises receiving the electronic programming guide identifier in a header specified by a session description protocol.

24. The method of claim 21, wherein the receiving the electronic programming guide identifier comprises receiving the electronic programming guide identifier in a session identifier specified.

25. The method of claim 21, wherein the receiving the electronic programming guide identifier comprises receiving the electronic programming guide identifier at an internet protocol address.

26. The method of claim 21, wherein the electronic programming guide identifier comprises a descriptor.

27. The method of claim 21, wherein the electronic programming guide identifier comprises a unique number.

28. The method of claim 27, wherein the electronic programming guide identifier comprises the number 2208988800.

29. A receiver comprising:

a display and a computer system configured to:
maintain a communication session with a broadcast terminal,
receive information from the broadcast terminal, wherein the information includes an electronic programming guide identifier having a value representing the availability of an electronic programming guide for enhanced television content from the broadcast terminal,
receive the enhanced television content, said identifier linking the enhanced television content and the electronic programming guide; and
request the display to display the electronic programming guide.

30. The receiver of claim 29, wherein to receive the electronic programming guide identifier, the computer system is to receive the electronic programming guide identifier using a session description protocol.

31. The receiver of claim 29, wherein to receive the electronic programming guide identifier, the computer system is to receive the electronic programming guide identifier in a header specified by a session description protocol.

32. The receiver of claim 29, wherein to receive the electronic programming guide identifier, the computer system is to receive the electronic programming guide identifier in a session identifier.

33. The receiver of claim 29, wherein to receive the electronic programming guide identifier, the computer system is to receive the electronic programming guide identifier at an internet protocol address.

34. The receiver of claim 29, wherein the electronic programming guide identifier comprises a descriptor.

35. The receiver of claim 34, wherein the electronic programming guide identifier comprises a unique number.

36. A computer-implemented method comprising:

maintaining a communication session with a terminal;

transmitting a session description file to the terminal, wherein the session description file provides information useful to receive an electronic programming guide for enhanced television content; and transmitting the enhanced television content to the terminal, wherein the content includes a portion of an electronic programming guide and the portion is associated with the session description file.

37. The method of claim 36, wherein the session description file identifies an electronic programming guide.

38. The method of claim 36, wherein the transmitting a session description file comprises transmitting a session description file using a session description protocol.

39. The method of claim 36, the transmitting a session description file comprises transmitting a session description file in a header specified by a session description protocol.

40. The method of claim 36, the transmitting a session description file comprises transmitting a session description file in a session identifier specified by a session description protocol.

* * * * *